United States Patent
Liu et al.

(10) Patent No.: US 7,158,346 B2
(45) Date of Patent: Jan. 2, 2007

(54) HEAT ASSISTED MAGNETIC RECORDING FILM INCLUDING SUPERPARAMAGNETIC NANOPARTICLES DISPERSED IN AN ANTIFERROMAGNETIC OR FERRIMAGNETIC MATRIX

(75) Inventors: Bin Liu, Pittsburgh, PA (US); Dieter K. Weller, Gibsonia, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 497 days.

(21) Appl. No.: 10/745,205

(22) Filed: Dec. 23, 2003

(65) Prior Publication Data

US 2005/0135010 A1   Jun. 23, 2005

(51) Int. Cl.
  *G11B 23/00* (2006.01)
  *G11B 5/82* (2006.01)
(52) U.S. Cl. .................. 360/131; 977/778; 360/135
(58) Field of Classification Search ............. 360/131, 360/135; 720/718; 977/778
  See application file for complete search history.

(56) References Cited

U.S. PATENT DOCUMENTS

| | | | |
|---|---|---|---|
| 4,379,183 A | 4/1983 | Araki et al. | 427/127 |
| 4,404,238 A | 9/1983 | Baldwin | 427/128 |
| 4,920,013 A | 4/1990 | Kobayashi et al. | 428/828.1 |
| 5,224,068 A | 6/1993 | Miyake et al. | 365/122 |
| 5,439,754 A | 8/1995 | Iwasaki et al. | 428/812 |
| 5,503,911 A | 4/1996 | Aoki et al. | 428/213 |
| 5,503,922 A | 4/1996 | Shimasaki et al. | 428/323 |
| 5,538,802 A | 7/1996 | Kitaori et al. | 428/836.3 |
| 5,565,266 A | 10/1996 | Hatwar et al. | 428/332 |
| 5,587,223 A | 12/1996 | White | 428/195.1 |
| 5,617,405 A | 4/1997 | Victora et al. | 369/275.1 |
| 5,738,927 A | 4/1998 | Nakamura et al. | 428/141 |
| 5,750,274 A | 5/1998 | Hatwar et al. | 428/819.1 |
| 5,768,075 A | 6/1998 | Bar-Gadda | 360/135 |
| 5,820,769 A | 10/1998 | Chou | 216/22 |
| 5,834,085 A | 11/1998 | Lairson et al. | 428/828.1 |
| 5,858,565 A | 1/1999 | Victora et al. | 428/819.1 |
| 5,942,342 A * | 8/1999 | Hikosaka et al. | 428/832.1 |
| 5,965,194 A | 10/1999 | Truong et al. | 427/127 |
| 6,007,623 A | 12/1999 | Thiele et al. | 117/95 |
| 6,055,139 A | 4/2000 | Ohtsuka et al. | 360/131 |
| 6,086,974 A | 7/2000 | Thiele et al. | 428/832.1 |
| 6,136,061 A | 10/2000 | Gibson | 75/231 |
| 6,166,885 A | 12/2000 | Yamamoto et al. | 360/135 |
| 6,183,893 B1 | 2/2001 | Futamoto et al. | 428/831.2 |
| 6,331,364 B1 | 12/2001 | Baglin et al. | 428/830 |
| 6,383,597 B1 | 5/2002 | Fullerton et al. | 428/836.1 |

(Continued)

FOREIGN PATENT DOCUMENTS

EP   0797192 A1   9/1997

(Continued)

OTHER PUBLICATIONS

Skumryev et al, "Beating the superparamagnetic limit with exchange bias", Jun. 19, 2003, Nature, v. 423, No. 6942, p. 850-853.*

(Continued)

*Primary Examiner*—Julie Anne Watko
(74) *Attorney, Agent, or Firm*—Alan G. Towner, Esq.; Pietragallo, Bosick & Gordon LLP

(57) ABSTRACT

Heat assisted magnetic recording systems with composite recording films are disclosed. The magnetic recording films include superparamagnetic nanoparticles dispersed in an antiferromagnetic or ferrimagnetic matrix. The matrix provides antiferromagnetic coupling with the superparamagnetic nanoparticles, and minimizes exchange interactions between adjacent nanoparticles.

37 Claims, 3 Drawing Sheets

U.S. PATENT DOCUMENTS

| | | | |
|---|---|---|---|
| 6,383,598 B1 | 5/2002 | Fullerton et al. | 428/830 |
| 6,391,430 B1 | 5/2002 | Fullerton et al. | 428/212 |
| 6,440,589 B1 | 8/2002 | Fullerton et al. | 428/826 |
| 6,493,164 B1 | 12/2002 | Kikitsu et al. | 360/59 |
| 6,500,497 B1 | 12/2002 | Wang et al. | 427/528 |
| 6,534,203 B1 | 3/2003 | Iwasaki et al. | 428/827 |
| 6,534,204 B1 | 3/2003 | Akimoto et al. | 428/828 |
| 6,534,205 B1 | 3/2003 | Sato et al. | 428/826 |
| 6,602,621 B1 | 8/2003 | Matsunuma et al. | 428/827 |
| 6,656,613 B1 | 12/2003 | Litvinov et al. | 428/827 |
| 2001/0016271 A1 | 8/2001 | Aoyama | 428/845.6 |
| 2001/0017820 A1 | 8/2001 | Akiyama et al. | 369/13.01 |
| 2001/0055701 A1 | 12/2001 | Abarra et al. | 428/828.1 |
| 2002/0071966 A1 | 6/2002 | Inomata et al. | 428/827 |
| 2003/0128635 A1* | 7/2003 | Ruigrok et al. | 369/13.55 |

FOREIGN PATENT DOCUMENTS

| | | |
|---|---|---|
| GB | 2302980 A | 2/1997 |
| JP | 07-021544 | 1/1995 |

OTHER PUBLICATIONS

Nogues et al, "Exchange bias in ferromagnetic nanoparticles embedded in an antiferromagnetic matrix", 2005, Int'l J. Nanotech, v. 2, No. 1-2, p. 23-42.*

R. H. Victora et al., "Predicted Spin and Orbital Contributions to the Magnetic Structure of Co/2X Superlattices," (Abstract), *J. Appl. Phys.*, vol. 70, No. 10, Nov. 15, 1991, pp. 5880.

E. A. M. Van Alphen et al., "Granular Co/Ag Multilayers: Relation Between Nanostructure, And Magnetic And Transport Properties," *Physical Review B*, vol. 51, No. 13, Apr. 1, 1995, pp. 8182-8192.

J. H. Huang et al., "High Coercivity and High Saturation Magnetization Mn-Al Thin Films," *IEEE Tran. Magn.*, vol. 31, No. 5, Sep. 1995, pp. 2494-2498.

E. N. Abarra et al., "Thermodynamic Measurements of Magnetic Ordering in Antiferromagnetic Superlattices," *Physical Review Letters*, vol. 77, No. 16, Oct. 14, 1996, pp. 3451-3454.

J. S. Yin et al., "Ordered Self-Assembling of Tetrahedral Oxide Nanocrystals," *Physical Review Letters*, vol. 79, No. 13, Sep. 29, 1997, pp. 2570-2573.

C. Chappert et al., "Planar Patterned Magnetic Media Obtained by Ion Irradiation," *Science*, vol. 280, Jun. 19, 1998, pp. 1919-1922.

H. Brune et al., "Self-Organized Growth of Nanostructure Arrays on Strain-Relief Patterns," *Letters To Nature*, vol. 394, Jul. 30, 1998, pp. 451-453.

H. Bernas et al., "Ion Beam Induced Magnetic Nanostructure Patterning," *Nucl. Instr. and Meth. in Phys. Res. B*, vol. 148, 1999, pp. 872-879.

T. D. Leonhardt et al., "$CrPt_3$ Thin Film Media for Perpendicular or Magneto-Optical Recording," *Journal of Applied Physics*, vol. 85, No. 8, Apr. 15, 1999, pp. 4307-4309.

T. Devolder et al., "Sub-50 nm Planar Magnetic Nanostructures Fabricated by Ion Irradiation," *Applied Physics Letters*, vol. 74, No. 22, May 31, 1999, pp. 3383-3385.

B. D. Terris et al., "Ion-Beam Patterning of Magnetic Films Using Stencil Masks," *Applied Physics Letters*, vol. 75, No. 3, Jul. 19, 1999, pp. 403-405.

O. Fruchart et al., "Self-Organized Growth Of Nanosized Vertical Magnetic Co Pillars On Au(111),", *Physical Review Letters*, vol. 83, No. 14, Oct. 4, 1999, pp. 2769-2772.

C. Chappert, "Ion Beam Induced Magnetic Thin Films Patterning," Seminar at Seagate Research, San Jose, CA, Oct. 20, 1999.

T. Devolder et al., "Patterning of Planar Magnetic Nanostructures by Ion Irradiation," *J. Vac. Sci. Technol. B*, vol. 17, No. 6, Nov./Dec. 1999, pp. 3177-3181.

S. P. Li et al., "Magnetic Nanoscale Dots on Colloid Crystal Surfaces," *Applied Physical Letters*, vol. 76, No. 6, Feb. 7, 2000, pp. 748-750.

S. L. Silva et al., "Fabricating Nanometer-Scale Co Dot and Line Arrays on Cu(100) Surfaces," *Applied Physical Letters*, vol. 76, No. 9, Feb. 28, 2000, pp. 1128-1130.

S. Sun et al, "Monodisperse FePt Nanoparticles and Ferromagnetic FePt Nanocrystal Superlattices," *Science*, vol. 287, Mar. 17, 2000, pp. 1989-1992.

B. D. Terris et al., "Patterning Magnetic Films by Ion Beam Irradiation," *Journal of Applied Physics*, vol. 87, No. 9, May 1, 2000, pp. 7004-7006.

D. Babonneau et al., "Evidence For A Self-Organized Growth In Granular $Co/Al_2O_3$ Multilayers," *Applied Physical Letters*, vol. 76, No. 20, May 15, 2000, pp. 2892-2894.

R. H. Victora et al., "Superlattice Magnetic Recording Media: Experiment and Simulation," *Journal of Magnetism and Magnetic Materials*, vol. 235, (2001), pp. 305-311.

G. Hughes, "Patterned Media," *Physics of Magnetic Recording*, Feb. 2, 2001, pp. 1-27.

T. Kato et al., "Magnetic Properties of Polycrystalline and Epitaxial $Cr_{1-x}Mn_xPt_3$ Alloy Films," *IEEE Trans. Magn.*, vol. 37, No. 4, Jul. 2001, pp. 2414-2416.

O. Hellwig et al., "Magnetic Patterning of Chemically-Ordered $CrPt_3$ Films," *Applied Physics Letters*, vol. 79, No. 8, Aug. 20, 2001, pp. 1151-1153.

T. Rausch et al., "Effects of Optical Spot/Magnetic Head Misalignment for Perpendicular Hybrid Magnetic Recording Systems," *IEEE Trans. Magn. Soc. Japan*, vol. 2, (2002), pp. 322-327.

* cited by examiner

HEAT ASSISTED MAGNETIC RECORDING FILM INCLUDING SUPERPARAMAGNETIC NANOPARTICLES DISPERSED IN AN ANTIFERROMAGNETIC OR FERRIMAGNETIC MATRIX

GOVERNMENT CONTRACT

This invention was made with United States Government support under Agreement No. 70NANB1H3056 awarded by the National Institute of Standards and Technology (NIST). The United States Government has certain rights in the invention.

FIELD OF THE INVENTION

The present invention relates to heat assisted magnetic recording films, and more particularly relates to films having superparamagnetic nanoparticles dispersed in an antiferromagnetic or ferrimagnetic matrix.

BACKGROUND OF THE INVENTION

Longitudinal magnetic recording in its conventional form has been projected to suffer from superparamagnetic instabilities at high bit densities. As the grain size of the magnetic recording medium is decreased in order to increase the areal density, a threshold known as the superparamagnetic limit at which stable data storage is no longer feasible is reached for a given material and temperature.

An alternative to longitudinal recording is perpendicular magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located around the main write pole or yoke for inducing a magnetic field from the write pole, through a hard magnetic recording layer of the storage medium, into a soft magnetic underlayer and back to the return pole.

Thermal stability of magnetic recording systems can be improved by employing a recording medium formed of a material with a very high magnetic anisotropy $K_u$). The energy barrier for a uniaxial magnetic grain to switch between two stabilized states is proportional to the product of the magnetic anisotropy $K_u$) of the magnetic material and the volume (V) of the magnetic grains. In order to provide adequate data storage, the product $K_u V$ should be as large as 60 kT, where k is the Boltzman constant and T is the absolute temperature, in order to provide 10 years of thermally stable data storage. Although it is desirable to use magnetic materials with high $K_u$, very few of such hard magnetic materials exist. Furthermore, with currently available magnetic materials, recording heads are not able to provide a sufficient magnetic writing field to write on such materials.

Heat assisted magnetic recording (HAMR) refers to the concept of locally heating a magnetic recording medium to reduce the coercivity of the recording medium so that the applied magnetic writing field can more easily direct the magnetization of the recording medium during the temporary magnetic softening of the recording medium caused by the heat source. HAMR allows for the use of small grain media, which is desirable for recording at increased areal densities, with a larger magnetic anisotropy at room temperature assuring a sufficient thermal stability.

However, several major problems are associated with HAMR designs. There are limited types of hard magnetic materials having sufficiently high magnetic anisotropies, e.g., $K_u > 10^7 \text{erg/cm}^3$. The candidates are $L_{10}$-phased materials such as FePt, CoPt, FePd and CoPd, NdFeB, and SmCo. All of these materials have chemically ordered structures, which are difficult to obtain while optimizing the desired microstructure. For example, annealing a FePt thin film at high temperature helps obtain the ordered $L_{10}$ phase, but promotes grain growth significantly. Another problem is that the Curie temperatures of such hard magnetic materials are generally very high, e.g., greater than 400° C. for FePt. Since magnetic recording discs rotate at very high speeds, it is difficult to raise the temperature of a surface spot of the media above its Curie temperature within such a short duration. Moreover, organic lubricant materials evaporate under such high temperature.

A need therefore exists for recording films that can effectively be used for heat-assisted magnetic recording.

SUMMARY OF THE INVENTION

The present invention provides heat assisted magnetic recording media including recording films having superparamagnetic nanoparticles embedded in an antiferromagnetic or ferrimagnetic matrix. As used herein, the term "superparamagnetic nanoparticles" means particles of ferromagnetic material having sufficiently small KuV, such that the magnetization of the material is unstable at ambient temperatures, i.e., the magnetization is capable of switching due to ambient thermal energy. The threshold at which a ferromagnetic particle becomes superparamagnetic depends on the composition of the material and its size. For some types of ferromagnetic materials, such as Co—Pt and other Co alloys, superparamagnetism occurs as the particle size is decreased below about 5 nm. The term "antiferromagnetic" refers to matrix materials in which adjacent spins align in opposite or antiparallel arrangements throughout the material at relatively low temperatures such that the material exhibits essentially no gross external magnetism. The term "ferrimagnetic" refers to matrix materials in which the magnetic spins of one class of atoms are opposed to the magnetic spins of another class of atoms within the material such that the material exhibits essentially very small gross external magnetism.

The individual superparamagnetic nanoparticles of the recording film are not thermally stable. However, since the nanoparticles are coupled with the antiferromagnetic or ferrimagnetic matrix, the particles are stable as long as the matrix is thermally stable. Due to antiferromagnetic coupling between the superparamagnetic nanoparticles and the matrix, the materials of the nanoparticles do not have to be chemically ordered, such as conventional $L_{10}$-phased FePt and SmCo which are difficult to fabricate. The exchange interactions between adjacent nanoparticles are small because the superparamagnetic nanoparticles are separated by the matrix. Therefore, the signal-to-noise ratio level is high even at small bit sizes. The thermal stability of the composite recording film is excellent because it takes an extremely high magnetic field to switch the anisotropy direction of the matrix material. Furthermore, the antiferromagnetic or ferrimagnetic matrix has essentially no (or very small) magnetic moment and contributes essentially no extra signal to the reader.

An aspect of the present invention is to provide a heat assisted magnetic recording film comprising an antiferromagnetic or ferrimagnetic matrix and superparamagnetic nanoparticles dispersed in the matrix.

Another aspect of the present invention is to provide a heat assisted magnetic recording system comprising a recording medium and a heat assisted magnetic recording head. The recording medium includes a magnetic recording film comprising an antiferromagnetic or ferrimagnetic matrix and superparamagnetic nanoparticles dispersed in the matrix. The heat assisted magnetic recording head is positioned adjacent to the recording medium and comprises a write pole for applying a magnetic write field to the recording medium, and a heat source for heating the recording medium proximate to where the write pole applies the magnetic write field to the recording medium. The magnetic recording film includes an antiferromagnetic or ferrimagnetic matrix, and superparamagnetic nanoparticles dispersed in the matrix.

A further aspect of the present invention is to provide a heat assisted method of recording data on a magnetic recording medium. The method comprises the steps of heating a magnetic recording film, and magnetically writing on the heated magnetic recording film, wherein the magnetic recording film comprises an antiferromagnetic or ferrimagnetic matrix, and superparamagnetic nanoparticles dispersed in the matrix.

These and other aspects of the present invention will be more apparent from the following description.

DETAILED DESCRIPTION OF THE INVENTION

Figure 1:
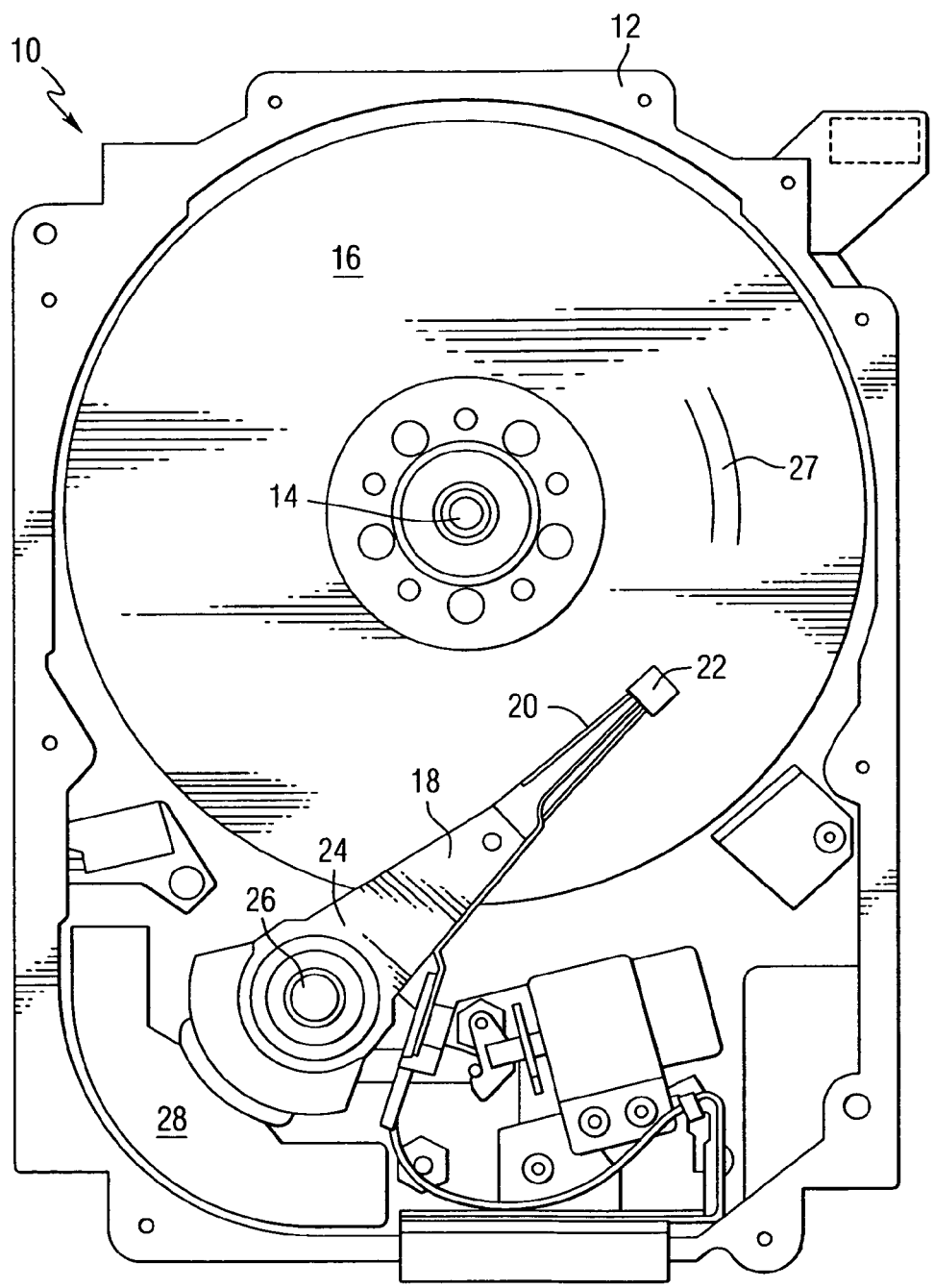
FIG. 1 is a pictorial representation of a disc drive storage system that can include a heat-assisted magnetic recording head and recording medium having a magnetic recording film in accordance with an embodiment of the present invention.

FIG. 1 is a pictorial representation of a disc drive 10 that can utilize a heat assisted magnetic recording head constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
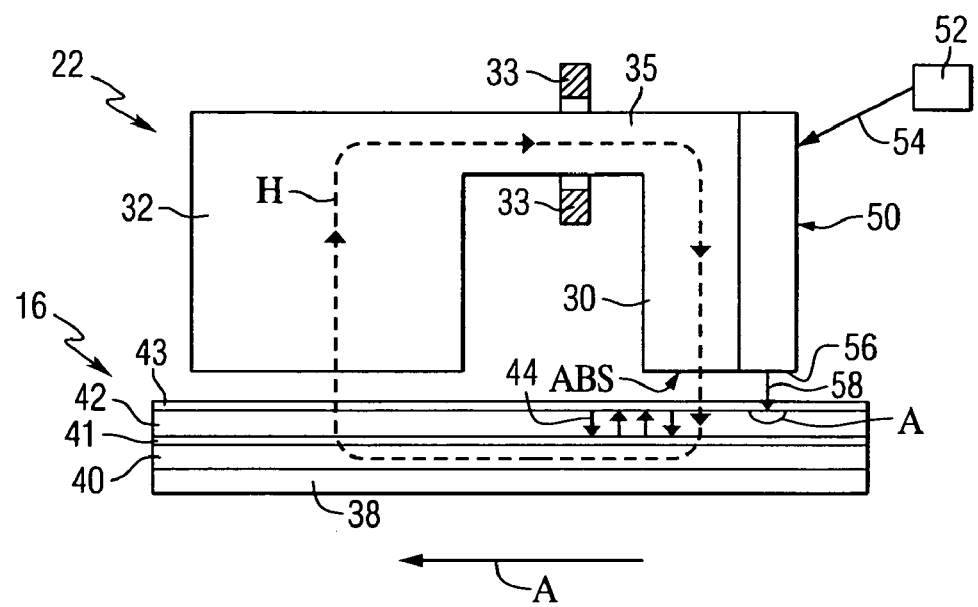
FIG. 2 is a partially schematic illustration of a heat-assisted magnetic recording head and recording medium which may incorporate a magnetic recording film in accordance with an embodiment of the present invention.

FIG. 2 is a partially schematic side view of a HAMR head 22 and a magnetic recording medium 16. Although an embodiment of the invention is described herein with reference to recording head 22 as a perpendicular magnetic recording head and the medium 16 as a perpendicular magnetic recording medium, it will be appreciated that aspects of the invention may also be used in conjunction with other type recording heads and/or recording mediums where it may be desirable to employ heat assisted recording. Specifically, the HAMR head 22 may include a writer section comprising a main write pole 30 and a return or opposing pole 32 that are magnetically coupled by a yoke or pedestal 35. It will be appreciated that the HAMR head 22 may be constructed with a write pole 30 only and no return pole 32 or yoke 35. A magnetization coil 33 may surround the yoke or pedestal 35 for energizing the HAMR head 22. The HAMR head 22 also may include a read head, not shown, which may be any conventional type read head as is generally known in the art. The recording medium 16 is positioned adjacent to or under the recording head 22 for movement, for example, in the direction of arrow A.

As illustrated in FIG. 2, the recording head 22 also includes structure for HAMR to heat the magnetic recording medium 16 proximate to where the write pole 30 applies the magnetic write field H to the recording medium 16. Specifically, such structure for HAMR may include, for example, a planar optical waveguide schematically represented by reference number 50. The waveguide 50 is in optical communication with a light source 52. The light source 52 may be, for example, a laser diode, or other suitable laser light sources for coupling a light beam 54 into the waveguide 50. Various techniques that are known for coupling light beam 54 into the waveguide 50 may be used in conjunction with the invention, such as, for example, the light source 52 may work in association with an optical fiber and external optics, such as an integrated spherical lens, for collimating the light beam 54 from the optical fiber toward a diffraction grating (not shown). Alternatively, for example, a laser may be mounted on the waveguide 50 and the light beam 54 may be directly coupled into the waveguide 50 without the need for external optical configurations. Once the light beam 54 is coupled into the waveguide 50, the light may propagate through the optical waveguide 50 toward a truncated end 56 of the waveguide 50 that is formed adjacent the air-bearing surface (ABS) of the recording head 22.

Figure 3:
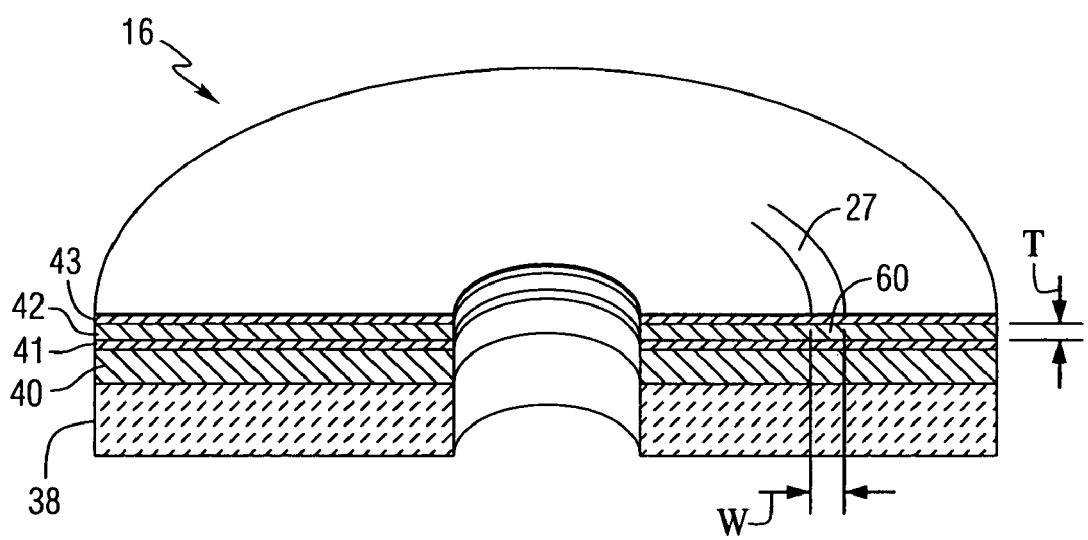
FIG. 3 is a partially schematic isometric sectional view of a heat-assisted magnetic recording medium including a magnetic recording film in accordance with an embodiment of the present invention.

As shown in FIG. 3, the heat-assisted magnetic recording medium 16 includes a composite magnetic recording film 42 of the present invention. The recording medium 16 also includes a substrate 38, an optional soft underlayer 40, an optional seed layer 41 and a protective overcoat 43. The substrate 38 may be made of any suitable material such as ceramic glass, amorphous glass, aluminum or NiP coated AlMg. The soft underlayer 40 has a typical thickness of from about 50 to about 1,000 nm, and may be made of any suitable material such as CoFe, FeCoB, FeAlN, FeAlSi, NiFe, CoZrNb or FeTaN. The soft underlayer 40 may also comprise laminated structures such as (FeCoB/Ta)·n where n is from 2 to 10, or (FeAlSi/C)·n where n is from 2 to 10. The soft underlayer 40 may further comprise exchange biased structures such as Cu/(IrMn/FeCo)·n where n is from 1 to 5. The seed layer 41 has a typical thickness of from about 1 to about 50 nm and may be used to control properties such as orientation and grain size of the subsequently deposited layers. For example, the seed layer 41 may be a face centered cubic material such as Pt which controls the orientation of the subsequently deposited film 42, may be a material such as Ru or Rh which controls grain size and facilitates epitaxial growth of the subsequently deposited layers, or a combination thereof. The seed layer may be made of one or more layers of material such as CoCr, CoCrRu, Ru, Pt, Pd, Rh, Ta, TiC, indium tin oxide (ITO), AlN or ZnO. The protective layer 43 may be made of any suitable material such as diamond-like carbon.

FIG. 3 illustrates a magnetic recording bit 60 (not drawn to scale) in the recording track 27 of the recording film 42. The recording bit 60 has a width W measured across the direction of the recording track 27, and a thickness T measured through the thickness of the film 42. The recording bit 60 also has a length L measured in the direction of the recording track 27, as most clearly shown in FIG. 4. The width W of the bit 60 typically ranges from about 10 to about 200 nm, for example, from about 30 to about 100 nm. The length L of the bit 60 typically ranges from about 5 to about 50 nm, for example, from about 7 to about 10 nm. The thickness T of the bit 60 typically ranges from about 2 to about 50 nm, for example, from about 5 to about 10 nm.

Figure 4:
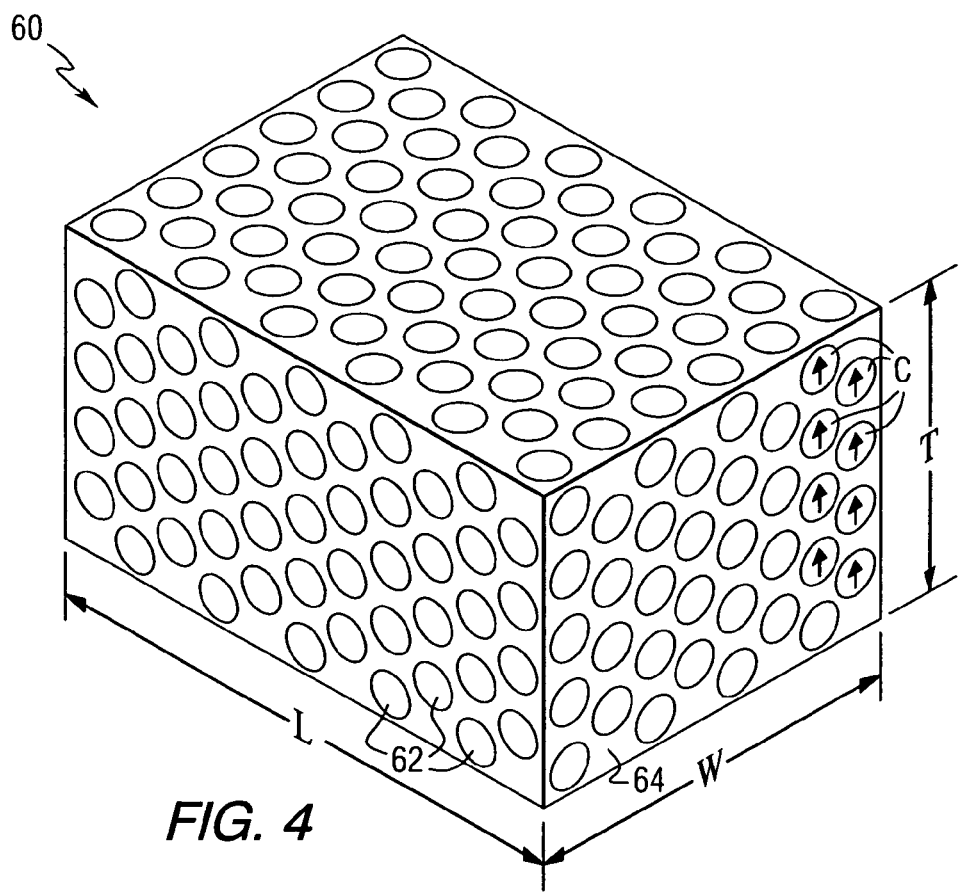
FIG. 4 is a partially schematic isometric view of a portion of a heat-assisted magnetic recording film of the present invention representing a single recording bit.
Figure 5:
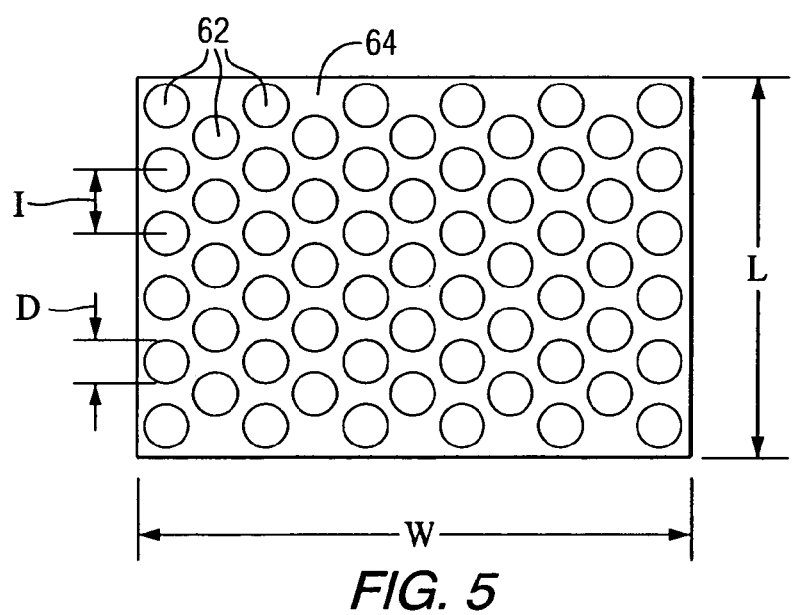
FIG. 5 is a top view of the recording bit of FIG. 4.

FIG. 4 is an isometric view of the recording bit 60. FIG. 5 is a top view of the recording bit 60 of FIG. 4. In accordance with the present invention, the recording bit 60 of the recording film 42 comprises superparamagnetic nanoparticles 62 dispersed in an antiferromagnetic or ferrimagnetic matrix 64. As shown in the embodiment of FIG. 4, the superparamagnetic nanoparticles 62 have easy axes of magnetizations aligned in a vertical direction perpendicular to the plane of the recording film 42, or the magnetic easy axis could be in the film plane as in longitudinal recording. As shown in FIG. 5, each superparamagnetic nanoparticle 62 has a diameter D which typically ranges from about 0.5 to about 5 nm. For example, the average diameter D of the nanoparticles 62 may be from about 0.7 to about 3 nm, or from about 1 to about 2 nm. As shown in FIG. 5, adjacent nanoparticles 62 are separated by an interparticle spacing I. The interparticle spacing I typically ranges from about 1 to about 10 nm. For example, the interparticle spacing I may be from about 2 to about 6 nm.

The nanoparticles 62 of the recording film 42 typically comprise from about 20 to about 70 volume percent of the recording film, for example, from about 25 to about 60 volume percent. The matrix 64 of the recording film 42 typically comprises from about 30 to about 80 volume percent of the recording film 42, for example, from about 40 to about 75 volume percent. Each recording bit 60 typically includes at least 40 or 50 of the nanoparticles 62.

The superparamagnetic nanoparticles 62 may be made of material such as a Co alloy. For example, the nanoparticles 62 may comprise a Co—Pt alloy comprising from about 10 to about 30 atomic percent Pt. The antiferromagnetic or ferrimagnetic matrix 64 may be made of any suitable material such as NiO, CoO, CoF$_3$, FeF$_3$, LaFeO$_3$, NdFeO$_3$, HoFeO$_3$, ErFeO$_3$, Al—Mn alloy and/or Pt—Mn alloy.

The material of the matrix 64 may have a Neel temperature $T_N$ above 373K (100° C.). One example of a matrix material is NiO ($T_N$=523K). It can be replaced by CoF$_3$ ($T_N$=460K), FeF$_3$ ($T_N$=394K), LaFeO$_3$ ($T_N$=740K), NdFeO$_3$ ($T_N$=760K), HoFeO$_3$ ($T_N$=700K), ErFeO$_3$ ($T_N$=620K), etc.

During heat assisted magnetic recording a laser 52 as shown in FIG. 2 or any other suitable heat source may be used to heat the matrix above or close to the Neel temperature TN of the matrix 64 of the recording film 42. A moderate magnetic write field H generated by the head 22, is synchronized with the heat source. In accordance with the present invention, the antiferromagnetic or ferrimagnetic matrix 64 of the recording film 42 will lose its thermal stability below but close to the $T_N$, or totally lose its antiferromagnetic ordering. Since the Curie temperature of the superparamagnetic particles is much higher than the $T_N$, the superparamagnetic particles still have very large magnetization, which enables them to be aligned with the writing field. Immediately, the matrix is cooled down in the field. When the antiferromagnetic (ferrimagnetic) matrix is cooled down far below the $T_N$, it regains thermal stability and couples with the superparamagnetic particles which are aligned in the field direction. Then the field is removed. Since the nanoparticles 62 are superparamagnetic and coupled with the antiferromagnetic or ferrimagnetic matrix 64, their orientation of magnetization will be maintained as soon as the matrix 64 switching process is complete. A conventional GMR reader or the like may be used to read back the magnetic signal generated by the ferromagnetic grains of the superparamagnetic nanoparticles.

EXAMPLE 1

In this example, NiO is used as an antiferromagnetic matrix material, and a Co—Pt alloy is used as the ferromagnetic material of the superparamagnetic nanoparticles. NiO has a moderate Neel temperature of about 250° C., superior corrosion resistance, and a relatively high blocking temperature of 200° C. The Co—Pt alloy has a hexagonal close packed (hcp) structure and its magnetic easy axis is the c-axis. A Ru seed layer is sputter deposited on top of a glass substrate, then the Co—Pt alloy and NiO are cosputtered by conventional sputtering techniques onto the Ru layer. The film is then covered with a protective carbon overcoat. The magnetic easy axis of the ferromagnetic grains of the Co—Pt nanoparticles are perpendicular to the film.

EXAMPLE 2

In this example, NiO is used as an antiferromagnetic matrix material and a Co—Pt alloy is used as the ferromagnetic material of the superparamagnetic nanoparticles. A MgO layer is deposited onto a glass substrate. A layer of NiO is deposited onto the MgO with the NiO grains oriented in the (100) direction. Co—Pt and NiO are then cosputtered onto the NiO prelayer, followed by deposition of a protective carbon overcoat. The magnetic grains of the Co—Pt nanoparticles have easy axes randomly oriented in the film plane.

Whereas particular embodiments of this invention have been described above for purposes of illustration, it will be evident to those skilled in the art that numerous variations of the details of the present invention may be made without departing from the invention as defined in the appended claims.

What is claimed is:

1. A heat assisted magnetic recording film comprising:
an antiferromagnetic or ferrimagnetic matrix; and
superparamagnetic nanoparticles dispersed in the matrix, wherein the nanoparticles have easy axes of magnetization aligned in a direction substantially perpendicular to a plane of the magnetic film.

2. The heat assisted magnetic recording film of claim 1, wherein the nanoparticles have an average particle size of less than 5 nm.

3. The heat assisted magnetic recording film of claim 1, wherein the nanoparticles have an average particle size of from 0.7 to 3 nm.

4. The heat assisted magnetic recording film of claim 1, wherein the nanoparticles have an average particle size of from 1 to 2 nm.

5. The heat assisted magnetic recording film of claim 1, wherein the nanoparticles comprise a Co alloy.

6. The heat assisted magnetic recording film of claim 1, wherein the nanoparticles comprise a Co—Pt alloy.

7. The heat assisted magnetic recording film of claim 1, wherein the matrix comprises a material having a Neel temperature above 100° C.

8. The heat assisted magnetic recording film of claim 1, wherein the matrix comprises a metal oxide.

9. The heat assisted magnetic recording film of claim 1, wherein the matrix comprises NiO, CoO, $CoF_3$, $FeF_3$, $LaFeO_3$, $NdFeO_3$, $HoFeO_3$, $ErFeO_3$, Al—Mn alloy and/or Pt—Mn alloy.

10. The heat assisted magnetic recording film of claim 1, wherein the nanoparticles comprise from 20 to 70 volume percent of the recording film and the matrix comprises from 30 to 80 volume percent of the recording film.

11. The heat assisted magnetic recording film of claim 1, wherein the nanoparticles are separated by an interparticle spacing of from 2 to 10 nm.

12. The heat assisted magnetic recording film of claim 1, wherein the recording film has a thickness of less than 20 nm.

13. The heat assisted magnetic recording film of claim 12, wherein the recording film comprises an average of at least three layers of the nanoparticles through the thickness of the recording film.

14. The heat assisted magnetic recording film of claim 1, wherein the recording film comprises data recording bits having widths W of from 10 to 200 nm, lengths L of from 5 to 50 nm, and thicknesses T of from 2 to 50 nm.

15. The heat assisted magnetic recording film of claim 14, wherein the bit width W is from 20 to 100 nm, the bit length L is from 7 to 10 nm, and the bit thickness T is from 5 to 10 nm.

16. The heat assisted magnetic recording film of claim 14, wherein each bit comprises at least 50 of the nanoparticles.

17. The heat assisted magnetic recording film of claim 1, wherein the recording film is deposited on a substrate.

18. The heat assisted magnetic recording film of claim 17, further comprising at least one seed layer between the recording film and the substrate.

19. The heat assisted magnetic recording film of claim 18, wherein the at least one seed layer comprises a face centered cubic structure.

20. The heat assisted magnetic recording film of claim 18, wherein the at least one seed layer comprises CoCr, CoCrRu, Ru, Pt, Pd, Rh, Ta, TiC, indium tin oxide (ITO), AlN or ZnO.

21. A heat assisted magnetic recording system comprising:
a recording medium including a magnetic recording film, the magnetic recording film comprising an antiferromagnetic or ferrimagnetic matrix, and superparamagnetic nanoparticles dispersed in the matrix, wherein the nanoparticles have easy axes of magnetization aligned in a direction substantially perpendicular to a plane of the magnetic film; and
a heat assisted magnetic recording head positioned adjacent to the recording medium, the heat assisted magnetic recording head comprising a write pole for applying a magnetic write field to the recording medium, and a heat source for heating the recording medium proximate to where the write pole applies the magnetic write field to the recording medium.

22. The heat assisted magnetic recording system of claim 21, wherein the nanoparticles have an average particle size of less than 5 nm.

23. The heat assisted magnetic recording system of claim 21, wherein the recording film has a thickness of less than 20 nm.

24. The heat assisted magnetic recording system of claim 21, wherein the recording film comprises data recording bits having widths W of from 20 to 200 nm, lengths L of from 5 to 50 nm, and thicknesses T of from 2 to 50 nm.

25. The heat assisted magnetic recording system of claim 21, wherein each bit comprises at least 50 of the nanoparticles.

26. The heat assisted magnetic recording system of claim 21, wherein the recording film is deposited on a substrate and at least one seed layer having a face centered cubic structure is deposited between the recording film and the seed layer.

27. A heat-assisted method of recording data on a magnetic recording medium, the method comprising:
providing a magnetic recording film comprising:
an antiferromagnetic or ferrimagnetic matrix; and
superparamagnetic nanoparticles dispersed in the matrix;
heating the magnetic recording film to a temperature above a Neel temperature of the matrix; and
magnetically writing on the heated magnetic recording film.

28. The method of claim 27, wherein the Neel temperature is at least 100° C.

29. The method of claim 27, wherein the nanoparticles have an average particle size of less than 5 nm.

30. The method of claim 27, wherein the recording film has a thickness of less than 20 nm.

31. The method of claim 27, wherein the recording film comprises data recording bits having widths W of from 20 to 200 nm, lengths L of from 5 to 50 nm, and thicknesses T of from 2 to 50 nm.

32. The method of claim 27, wherein the recording film is deposited on a substrate and at least one seed layer having a face centered cubic structure is deposited between.

33. The method of claim 27, wherein the nanoparticles have easy axes of magnetization aligned in a direction substantially perpendicular to a plane of the magnetic film.

34. A magnetic recording film comprising:
an antiferromagnetic or ferrimagnetic matrix; and
superparamagnetic nanoparticles dispersed in the matrix, wherein the nanoparticles have easy axes of magnetization aligned in a direction substantially perpendicular to a plane of the magnetic film.

35. The magnetic recording film of claim 34, wherein the nanoparticles have an average particle size of less than 5 nm.

36. The magnetic recording film of claim 34, wherein the nanoparticles have an average particle size of from 0.7 to 3 nm.

37. The magnetic recording film of claim 34, wherein the nanoparticles comprise a Co—Pt alloy.

* * * * *

UNITED STATES PATENT AND TRADEMARK OFFICE
CERTIFICATE OF CORRECTION

PATENT NO. : 7,158,346 B2
APPLICATION NO. : 10/745205
DATED : January 2, 2007
INVENTOR(S) : Bin Lu and Dieter K. Weller It is certified that error appears in the above-identified patent and that said Letters Patent is hereby corrected as shown below:

On the Title Page
Item (12) United States Patent
"Liu et al." should read --Lu et al. --

On the Title Page
Item (73) Inventors:
"Bin Liu" should read -- Bin Lu --

Column 1, Line 47
"...magnetic anisotropy $K_u$)." should read --...magnetic anisotropy ($K_u$).--

Column 1, Line 50
"...magnetic anisotropy $K_u$)." should read --...magnetic anisotropy ($K_u$).--

Column 5, Line 8
"...AIN or ZnO." should read --...A1N or ZnO.--

Column 5, Line 65
"...temperature TN of the matrix..." should read --...temperature $T_N$ of the matrix...--

Column 7, Line 52
"...AIN or ZnO." should read --...A1N or ZnO.--

Column 8, Line 45
"...is deposited between." should continue "...is deposited between" --the recording field and the seed layer--.

Signed and Sealed this

Twelfth Day of June, 2007

JON W. DUDAS
*Director of the United States Patent and Trademark Office*